UNITED STATES PATENT OFFICE.

GUSTAF HJALMER LINDSTRÖM, OF NEW PLYMOUTH, NEW ZEALAND, ASSIGNOR TO FITZROY TANNING COMPANY LIMITED, OF NEW PLYMOUTH, NEW ZEALAND.

PROCESS OF TANNING.

1,039,150. Specification of Letters Patent. Patented Sept. 24, 1912.

No Drawing. Application filed January 21, 1910. Serial No. 539,247.

*To all whom it may concern:*

Be it known that I, GUSTAF HJALMER LINDSTRÖM, a subject of the King of Great Britain, residing at Hospital Road, New Plymouth, New Zealand, have invented a new and useful Improved Process of Tanning; and I do hereby declare the following to be a full, clear, and exact description of the same.

This invention relates to an improved process for tanning hides for the production of leather, that has been designed in order to provide for the quick and economical carrying out of such operations and without the use of the usual acids which tend to destroy the gelatin in the hide and deteriorate the quality thereof.

The invention consists in the submission of the hides after the usual preliminary treatment for unhairing, cleaning, and washing them, to the combined action of special tanning solutions hereinafter described.

In carrying out the invention it is preferred that the preliminary treatment of the hides shall consist in first washing them twice in clean water for a period of from 24 to 36 hours and then placing them in a weak lime bath for a period of about 36 hours. After this they are submitted to a bath of a solution of lime and sulfid of sodium in water and allowed to remain therein for six days. The hides are then removed and placed in water heated to a temperature of about 80° Fah. for a period of five or six hours, when they are removed, unhaired in the usual way, fleshed and washed in clean water. The hides are then submitted to the bating action of a bate composed of fowl dung and hot water and paddled therein for about four hours while maintained at a temperature of 80° Fah. They are next removed and washed to remove the dirt and lime, after which they are subjected to the action of a lactic acid solution in a paddle pit for about two hours. This preliminary treatment of the hides forms no part of the present invention and while it is the preferred manner of treating them for the subsequent tanning, it is to be understood that other ways of treating them for the expressed purposes, may be adopted. After this preliminary treatment, the hides are taken and placed within a revolving drum containing a solution of borax and water at a temperature of about 110° to 120° Fah. and the drum revolved for about 10 minutes. The solution is then drained off and a fresh quantity introduced into the drum, and the drum again revolved for another ten minutes. The solution is then drained away, and fresh clean water at a temperature of 80° or 90° Fah. placed in the drum and the drum again rotated for a short time. These treatments of the hides by the hot borax solution and the clean warm water, will serve to clean out all dirt that may have been left in them after the preliminary treatment, while opening the pores of the hides to allow of the actual tanning solutions acting fully thereon. The water is then drained from the drum and when the hides have been well drained they are subjected to the action of a solution of alum, common salt and pyrophosphate of sodium in water at a temperature of 100° to 110° Fah. This solution is preferably prepared by dissolving the alum common salt in the desired quantity of hot water and dissolving the pyrophosphate of sodium, in a separate quantity of hot water and then mixing the two solutions together. This mixed solution is placed in the drum with the hides in two separate lots, the drum being rotated for about 30 minutes when the first portion is introduced and for about 15 minutes after the second lot has been added. The solution is then drained off into a vessel and the hides also removed and placed in such vessel with the solution and allowed to remain therein for three or four hours, or longer if desired. After this soaking, the hides are removed, placed over trestles or the like and drained for about twelve hours. When drained, the hides are replaced in the drum and submitted to the washing action of another borax solution, and the solution then drained away. A fresh quantity of the solution of alum, common salt and pyrophosphate of sodium, prepared preferably in the before mentioned manner, is now mixed with a solution of crude gambier and quebracho and placed in the drum with the hides and the drum revolved for about three hours. This mixture is preferably added in three separate quantities, the drum being rotated as each portion is placed in the drum. The gambier and quebracho solution is obtained by dissolving the desired quantity of gambier in hot water and in dissolving the proper proportion of quebracho in a separate quantity of hot water and then adding the one to the other. For certain classes of leather, such as boot, sole and harness leather, the hides and the above mixture instead of being placed in a revolving drum, may be placed in a tanning pit with a small quantity of oak extract and allowed to remain there for about two days. After the hides have been submitted to the combined action of this mixture of the alum, salt and pyrophosphate of sodium solution with the gambier and quebracho solution, they are placed within a pit containing borax and water solution for about two hours and then removed, drained over trestles and curried in the usual way when the process is complete.

The strengths of the various solutions for treating the hides will be varied to suit the different classes and weights of hides being treated.

The following proportions have been found to be effective in treating 10 cow hides of medium weight, i. e., from 45 to 50 lbs. each, viz:—for the first tanning solution, 25 lbs. alum, 15 lbs. common salt, 5 lbs. pyrophosphate of sodium, 24 gallons of water. For the borax washing solution to which the hides are then submitted, two pounds of borax are dissolved in 40 gallons of water.

For the second tanning mixture, the proportions are:—5 lbs. alum, 2½ lbs. salt, 1½ lbs. pyrophosphate of sodium, dissolved in 8 gallons of water and added to 12 to 15 lbs. gambier, 10 lbs. quebracho, dissolved in 22 gallons of water.

The sulfid of sodium solution may be prepared as follows: 2½ bushels of quick lime are dissolved in 40 gallons of water. This is added to the lime pit making 1,500 gallons of lime water. 10 lbs. of ordinary commercial sulfid of sodium are then dissolved in 20 gallons of water by boiling. When thoroughly dissolved, this is added to the lime-water and thoroughly mixed. This composition acts upon the hides and after handling for 6 or 7 days they are ready for unhairing.

The lactic acid solution may be prepared as follows: For the first pack of 50 hides is used a ¼% solution of lactic acid, made by adding one gallon of lactic acid of 50% strength to 400 gallons of water. For each succeeding pack, ⅛% lactic acid is used, that is ½ gallon of lactic acid of 50% strength to the same liquor. The purpose of the lactic acid is to neutralize the lime, and to have a cleaning and reducing effect upon the hide.

For the final borax washing solution five pounds of borax are dissolved in 500 gallons of water.

What I do claim as my invention, and desire to secure by Letters Patent, is:—

1. The improved process of tanning hides consisting in subjecting the hides to an initial unhairing, cleaning, and washing treatments and in then treating them to a solution of alum, common salt and pyrophosphate of sodium in water and to the subsequent treatment of a mixture of such solution with a solution of gambier and quebracho in water, substantially as specified.

2. The improved process of tanning hides consisting in subjecting the hides to an initial unhairing, cleaning, and washing treatments and in then treating them to a solution of alum, common salt and pyrophosphate of sodium in water and to the subsequent treatment of a mixture of such solution with a solution of gambier and quebracho in water, and to baths of borax solution in water alternated therewith substantially as specified.

3. The improved process of tanning hides consisting in subjecting the hides to initial unhairing, cleaning, and washing treatments and in then submitting them to the action of a solution of alum, common salt and pyrophosphate of sodium in water and to the subsequent treatment of a mixture of such solution with a solution of gambier and quebracho in water, all prepared in the manner and approximately in the proportions herein specified.

Dated this 14 day of December, 1909.

In testimony whereof, I have signed this specification in the presence of two subscribing witnesses.

GUSTAF HJALMER LINDSTRÖM.

Witnesses:
   Thos. S. Weston,
   G. F. Wilson.